(12) United States Patent
Sinn et al.

(10) Patent No.: US 11,809,969 B2
(45) Date of Patent: Nov. 7, 2023

(54) DYNAMICALLY INTEGRATING INTERACTIVE MACHINE LEARNING MULTI-MODELS

(71) Applicant: ADOBE INC., San Jose, CA (US)

(72) Inventors: Richard Pong Nam Sinn, Milpitas, CA (US); Chun Hao Wang, San Jose, CA (US); Thomas Todd Donahue, Carlsbad, CA (US)

(73) Assignee: Adobe Inc., San Jose, CA (US)

( * ) Notice: Subject to any disclaimer, the term of this patent is extended or adjusted under 35 U.S.C. 154(b) by 486 days.

(21) Appl. No.: 16/916,807

(22) Filed: Jun. 30, 2020

(65) Prior Publication Data
US 2021/0406325 A1    Dec. 30, 2021

(51) Int. Cl.
*G06N 20/00* (2019.01)
*G06F 16/9535* (2019.01)
*G06F 18/24* (2023.01)

(52) U.S. Cl.
CPC ......... *G06N 20/00* (2019.01); *G06F 16/9535* (2019.01); *G06F 18/24* (2023.01)

(58) Field of Classification Search
CPC .. G06F 16/9535; G06F 16/285; G06F 16/355; G06F 16/958; G06F 2201/86; G06F 11/324; G06F 11/3438; G06F 16/3334; G06F 16/338; G06F 16/35; G06F 16/55; G06F 16/904; G06F 18/24; G06N 20/00; G06K 9/6267; G06Q 30/02; G06Q 30/0201; G06Q 30/0269; G06Q 30/0631

USPC ......................................................... 707/706
See application file for complete search history.

(56) References Cited

U.S. PATENT DOCUMENTS

| | | | |
|---|---|---|---|
| 2012/0179973 A1* | 7/2012 | Brolley | G06Q 30/0282 715/738 |
| 2013/0254155 A1* | 9/2013 | Thollot | G06F 16/283 707/602 |
| 2016/0092598 A1* | 3/2016 | Mishra | G06F 16/9535 707/740 |
| 2018/0157734 A1* | 6/2018 | Drushku | G06F 16/285 |
| 2018/0330248 A1* | 11/2018 | Burhanuddin | G06N 7/01 |
| 2019/0034813 A1* | 1/2019 | Das | G06N 5/022 |
| 2019/0378149 A1* | 12/2019 | Gao | G06Q 10/0637 |
| 2020/0183930 A1* | 6/2020 | Das | G06N 5/046 |
| 2021/0064965 A1* | 3/2021 | Pardeshi | A63F 13/85 |

* cited by examiner

*Primary Examiner* — Evan Aspinwall
(74) *Attorney, Agent, or Firm* — Shook, Hardy & Bacon L.L.P.

(57) ABSTRACT

An improved analytics system dynamically generates, integrates, and deploys multiple models for use related to a particular user and/or user segment. The integrated model analytics system can deploy a set of models specifically identified for a user from a group of models related to the service. This set of models can be used to provide recommendations for the user related to content of the service. As the user continues to interact with the service, the integrated model analytics system can dynamically update multiple models from the set of models based on real-time user interactions. These updated models can be used to generate updated recommendations for the user that can be used to dynamically update content presented to the user. In addition, this updated model can be used when providing recommendations for users in other user segments.

20 Claims, 9 Drawing Sheets

DYNAMICALLY INTEGRATING INTERACTIVE MACHINE LEARNING MULTI-MODELS

BACKGROUND

Business intelligence or analytics systems are computer-based systems that collect and analyze data, for example, related to customers. Such analytics systems can provide insights about customers, products, and/or business trends based on analyzed data. For instance, analytics systems often provide insight into customer behavior. In this way, analytics systems often attempt to answer questions like why a customer decided to purchase a product and/or what is likely to make the customer purchase a product in the future. This insight can, for instance, allow for the creation of targeted content for a specific customer.

SUMMARY

Embodiments of the present disclosure are directed towards an integrated model analytics system that allows for dynamically updating multiple models based on real-time user interactions. In accordance with embodiments of the present disclosure, the integrated model analytics system allows a targeted (e.g., intelligently selected) set of models to be combined and used for analyzing the particular user segment to generate recommendations. For instance, integrated model analytics system allows for any number of unrelated models to be combined as an integrated set of models for a user. This set of models can then be used to provide recommendations for the user related to the website (e.g., order of content on a webpage, order of content returned based on a user search query, etc.).

In particular, a user can be classified into a user segment. For instance, features associated with a user can be used in the classification. A feature can be information associated with a user (e.g., entitlement information indicating a subscription to photograph applications or document editing applications). Using one or more features associated with a user, the user can be placed in a feature bucket. This feature bucket can correspond to a particular set of models related to a feature (e.g., photography bucket, document bucket, etc.). In this way, based on the classification of the user, a particular set of models can be identified for the user. This set of models can then be used to provide recommendations for the user related to the website (e.g., order of content on a webpage, order of content returned based on a user search query, etc.). In addition, as the user interacts with content on the website, models can be automatically updated and redeployed to provide new recommendations for the user related to the website (e.g., updating the order of content on a webpage, updating the order of content returned based on a user search query, etc.). Further, the updated models can be deployed to generate content for a user in a different user segment. In this way, models can be automatically updated and redeployed to improve user engagement with the service (e.g., website, application, etc.).

DETAILED DESCRIPTION OF THE INVENTION

Figure 1A:
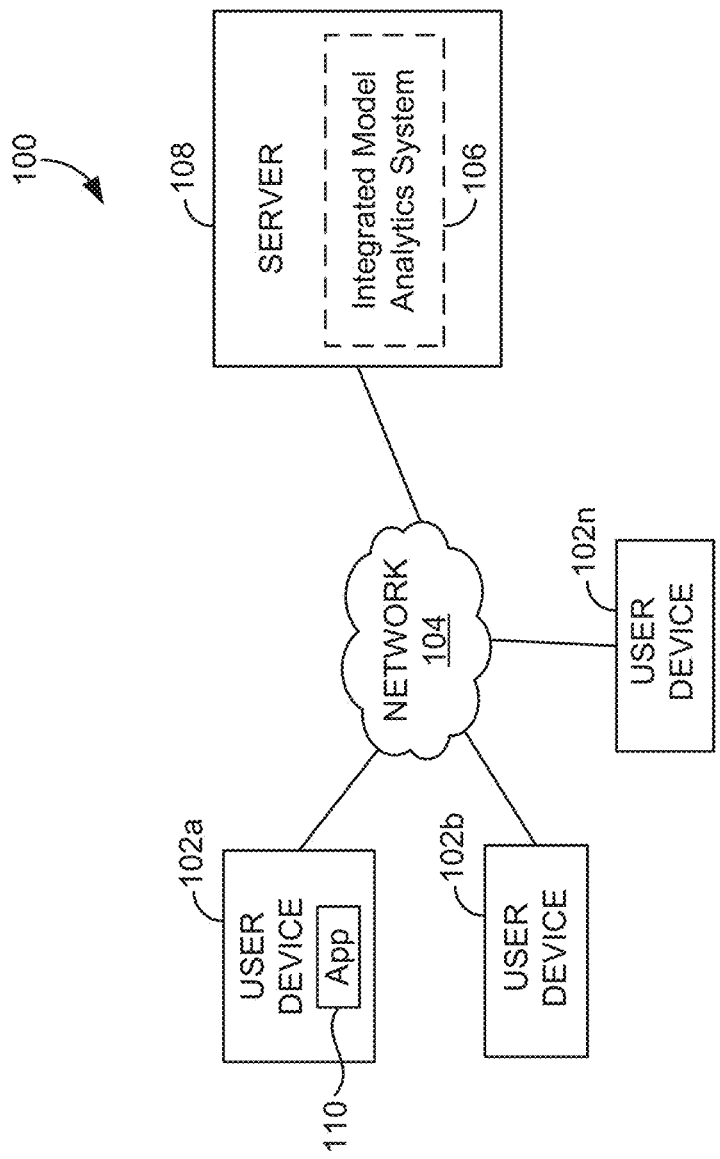
FIG. 1A depicts an example configuration of an operating environment in which some implementations of the present disclosure can be employed, in accordance with various embodiments.

The subject matter of the present disclosure is described with specificity herein to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

A vast amount of data can be gathered that relates to customers of a business (e.g., subscription-based businesses). Such data can relate to customer characteristics and/or behaviors as a customer interacts with one or more products related to the business. Analytics systems are typically employed to process the vast amount of data that is generated in relation to customers. Often, analytic systems process such data to assist in decision-making related to customers. With the advancement of technology, analytics have shifted to using deep learning techniques (e.g., based on neural networks). Such deep learning techniques have shown promise in analyzing data to make recommendations. However, oftentimes, a business will use a single homogenous model to analyze data; or when a business uses multiple models, each model independently performs an unrelated analysis. In this way, conventional use of models often provide a limited analysis of data.

Accordingly, embodiments of the present disclosure are directed to an improved analytics system (referred to herein as an integrated model analytics system) that addresses the technical deficiencies of existing analytics systems with respect to, for example, making user recommendations (e.g., based on user behavior). In particular, and as described herein, the integrated model analytics system can intelligently integrate multiple models (e.g., machine learning models) for enhanced user analytics to improve user engagement. For instance, the integrated multi-model analytics system can dynamically generate, integrate, and deploy multiple models for use related to a particular user and/or user segment. Each user segment and the behavior of its users can affect other user segments by updating models based on real-time interactions (e.g., such that one user segment can learn from other user segments). In this way, a heterogeneous set of models can be selected and deployed (e.g., based on the user and/or user segment) where the set of models can be incorporated together to provide deeper insight into user behavior as well as how the models within the set of models interact with each other (e.g., insight into how models interact with each other).

As an example, as a user interacts with a service (e.g., business' website, application, etc.), the integrated model analytics system can deploy a set of models specifically identified for the user from a group of models related to the service. This set of models can be used to provide recommendations for the user related to content of the service. For instance, such recommendations from the set of models can be simultaneously integrated to generate content presented via a graphical user interface (e.g., "GUI"). Thus, the integrated model analytics system can incorporate recommendations from the set of models identified for the user into the content presented via the GUI (e.g., order of content on a webpage).

As the user continues to interact with the service, the integrated model analytics system can dynamically update multiple models from the set of models based on real-time user interactions. For instance, such real-time interactions from the user can trigger dynamic updates of any of the set of models related to the interactions by the user (e.g., based on the interactions being related to one or more runtime attributes for a model). For instance, interactions by the user can be used to update a model even if the interactions are associated with content based on a recommendation from a different model (e.g., where the content relate to attributes for both models). As an example, if a first model recommends content based on categories and a second model recommends applications to buy, when a user interacts with content based on the recommended categories (e.g., the content related to a first attribute), the user interactions can also be used to update the second model (e.g., when the first attribute also relates to the second model). In this way, the interactions can dynamically trigger an update of both models. These updated models can be used (e.g., along with the rest of the set of models) to generate updated recommendations for the user that can be used to dynamically update content presented to the user (e.g. via the GUI). In addition, this updated model can be used when providing recommendations for users in other user segments. In this way, models can be automatically updated and redeployed to improve user engagement with the service (e.g., website, application, etc.).

In particular, as described herein, the integrated model analytics system allows for leveraging real-time interactions by a user with content related to multiple models to intelligently and dynamically update models based on the real-time interactions. Advantageously, intelligently combining multiple models allows one or more models to be updated based on incorporating real-time interactions (e.g., to provide updated recommendations based on user interactions). In this way, the multiple models (e.g., related to a user segment) can be used to improve user engagement by providing recommendations based on content of interest (e.g., triggered based on attributes related to the content overcoming a predefined threshold to update a model).

In more detail, a user can be classified into a particular user segment. In some embodiments, such a user can be classified upon visiting a service (e.g., website, application, etc.) associated with a business. In other embodiments, the user can be classified prior to visiting the service (e.g., upon signing up for a subscription associated with the business). Any number of classification techniques or models can be used to classify a user. For example, a classifier can be used to identify user segments based on features associated with a user (e.g., applications a user has subscribed to and/or interactions by a user with applications associated with the business). In turn, if a user has a feature associated with them (e.g., or their account), the user can be categorized into a corresponding feature bucket. For instance, a feature can be information associated with a user (e.g., entitlement information indicating a subscription to photograph applications or document editing applications), and a feature bucket can correspond to a particular set of models related to a feature (e.g., photography bucket, document bucket, etc.). In this way, when a user is classified within a feature bucket, a set of models can be specifically identified for deployment to make recommendations for that user. In some embodiments, a user can be placed within more than one feature bucket (e.g., based on having more than one associated feature).

As an example of an implementation of such an integrated model analytics system, when a user visits a website, the website can call a classifier of the integrated model analytics system to classify the user. Based on the classification of the user (e.g., into a feature bucket), a particular set of models can be identified for the user. This set of models can then be used to provide recommendations for the user related to the website (e.g., order of content on a webpage, order of content returned based on a user search query, etc.). In addition, as the user interacts with content on the website, models can be automatically updated and redeployed to provide new and/or updated recommendations for the user related to the website (e.g., updating the order of content on a webpage, updating the order of content returned based on a user search query, etc.).

Such an integrated model analytics system allows for any number of models to be combined as an integrated set of models for a user (e.g., based on the user being related to a particular user segment). These models can generally relate to user characteristics and/or user behaviors of the particular user segment (e.g., entitlement information). In this way, the integrated model analytics system allows a targeted (e.g., intelligently selected) set of models to be combined and used for analyzing the particular user segment to generate recommendations.

Turning to FIG. 1A, FIG. 1A depicts an example configuration of an operating environment in which some implementations of the present disclosure can be employed, in accordance with various embodiments of the present disclosure. It should be understood that this and other arrangements described herein are set forth only as examples. Other arrangements and elements (e.g., machines, interfaces, functions, orders, and groupings of functions, etc.) can be used in addition to or instead of those shown, and some elements may be omitted altogether for the sake of clarity. Further, many of the elements described herein are functional entities that may be implemented as discrete or distributed components or in conjunction with other components, and in any suitable combination and location. Various functions described herein as being performed by one or more entities may be carried out by hardware, firmware, and/or software. For instance, some functions may be carried out by a processor executing instructions stored in memory as further described with reference to FIG. 8.

It should be understood that operating environment 100 shown in FIG. 1A is an example of one suitable operating environment. Among other components not shown, operating environment 100 includes a number of user devices, such as user devices 102a and 102b through 102n, network 104, and server(s) 108. Each of the components shown in FIG. 1A may be implemented via any type of computing device, such as one or more of computing device 800 described in connection to FIG. 8, for example. These components may communicate with each other via network 104, which may be wired, wireless, or both. Network 104 can include multiple networks, or a network of networks, but is shown in simple form so as not to obscure aspects of the present disclosure. By way of example, network 104 can include one or more wide area networks (WANs), one or more local area networks (LANs), one or more public networks such as the Internet, and/or one or more private networks. Where network 104 includes a wireless telecommunications network, components such as a base station, a communications tower, or even access points (as well as other components) may provide wireless connectivity. Networking environments are commonplace in offices, enterprise-wide computer networks, intranets, and the Internet. The network 104 may be any network that enables communication among machines, databases, and devices (mobile or otherwise). Accordingly, the network 104 may be a wired network, a wireless network (e.g., a mobile or cellular network), a storage area network (SAN), or any suitable combination thereof. In an example embodiment, the network 104 includes one or more portions of a private network, a public network (e.g., the Internet), or combination thereof. Accordingly, network 104 is not described in significant detail.

It should be understood that any number of user devices, servers, and other components may be employed within operating environment 100 within the scope of the present disclosure. Each may comprise a single device or multiple devices cooperating in a distributed environment.

User devices 102a through 102n can be any type of computing device capable of being operated by a user. For example, in some implementations, user devices 102a through 102n are the type of computing device described in relation to FIG. 8. By way of example and not limitation, a user device may be embodied as a personal computer (PC), a laptop computer, a mobile device, a smartphone, a tablet computer, a smart watch, a wearable computer, a personal digital assistant (PDA), an MP3 player, a global positioning system (GPS) or device, a video player, a handheld communications device, a gaming device or system, an entertainment system, a vehicle computer system, an embedded system controller, a remote control, an appliance, a consumer electronic device, a workstation, any combination of these delineated devices, or any other suitable device.

The user devices can include one or more processors, and one or more computer-readable media. The computer-readable media may include computer-readable instructions executable by the one or more processors. The instructions may be embodied by one or more applications, such as application 110 shown in FIG. 1A. Application 110 is referred to as a single application for simplicity, but its functionality can be embodied by one or more applications in practice. As indicated above, the other user devices can include one or more applications similar to application 110.

The application(s) may generally be any application capable of facilitating the exchange of information between the user devices and the server(s) 108 to dynamically cause the generation integration, and deployment multiple models (e.g., machine learning models) for use related to a particular user segment. In some implementations, the application(s) comprises a web application, which can run in a web browser, and could be hosted at least partially on the server-side of environment 100. In addition, or instead, the application(s) can comprise a dedicated application, such as an application having user analytics functionality. For example, such an application can be configured to analyze user data to determine content for particular user segment. Such analysis can be performed, for instance, using the integrated multiple models. As another example, such an application can be configured to display the content based on the analysis of user data related to the particular user segment. In some cases, the application is integrated into the operating system (e.g., as a service). It is therefore contemplated herein that "application" be interpreted broadly.

In accordance with embodiments herein, application 110 can employ intelligently integrated multiple models to incorporate recommendations for a particular user segment and/or user. In embodiments, a user of application 110 may be classified into a particular user segment. In some implementations, any number of classification techniques or models can be used to classify the user. Based on the user classification, application 110 may receive recommendations related to the user segment (e.g., that the user was classified into). These recommendations can be based on a set of models that correspond to the particular user segment. For instance, the models can relate to features of the particular user segment. As an example, such features can include entitlement information (e.g., what applications a user has subscribed to, what market segment a user belongs to, etc.). These recommendations can be output to a user, for example, via the user device 102a. Such output can be, for example, a recommendation of how content should be presented to the user (e.g., where the recommendation is an order content to present on a webpage). Example applications associated with the integrated model analytics system can be related to ADOBE CREATIVE CLOUD. One example of using the integrated model analytics system can relate to a website associated with ADOBE CREATIVE CLOUD (e.g., including Creative Cloud Home and Creative Cloud Search).

The user device can communicate over a network 104 with a server 108 (e.g., a Software as a Service (SAAS) server), which provides a cloud-based and/or network-based integrated model analytics system 106. The integrated model analytics system may communicate with the user devices and corresponding user interfaces to facilitate providing content based on recommendations from multiple models related to the particular user segment based on user behavior. Such recommendations may be provided to a user via a user interface related to the user device using, for example, application 110.

As described herein, server 108 can facilitate integrating multiple models related to a particular user segment based on user behavior via integrated model analytics system 106. Server 108 includes one or more processors, and one or more computer-readable media. The computer-readable media includes computer-readable instructions executable by the one or more processors. The instructions may optionally implement one or more components of integrated model analytics system 106, described in additional detail below. Server 108 is capable of dynamically generating, integrating, and/or deploying multiple models for use related to a particular user segment. In particular, such multiple models can be used to provide recommendations related to the particular user segment. As a user interacts with content, one or more model can be updated based on interactions with content of interest (e.g., triggered based on interactions with content overcoming a predefined threshold). These updated model can then be used to update, for example, recommendations (e.g. based on the user interactions) to improve user engagement.

Integrated model analytics system 106 can classify a user and based on the user classification, identify a targeted (e.g., intelligently selected) set of models to be combined to a provide recommendations for the user to improve user engagement associated with a business. The system can employ the combination of the set of models identified based on the classification of the user. In addition, integrated model analytics system 106 can use real-time interactions from a particular user segment (or user) to trigger dynamic updates of any of the set of models related to the interactions.

For cloud-based implementations, the instructions on server 108 may implement one or more components of integrated model analytics system 106. Application 110 may be utilized by a user to interface with the functionality implemented on server(s) 108, such as integrated model analytics system 106. In some cases, application 110 comprises a web browser. In other cases, server 108 may not be required, as further discussed with reference to FIG. 1B. For example, the components of integrated model analytics system 106 may be implemented completely on a user device, such as user device 102a. In this case, integrated model analytics system 106 may be embodied at least partially by the instructions corresponding to application 110.

Thus, it should be appreciated that integrated model analytics system 106 may be provided via multiple devices arranged in a distributed environment that collectively provide the functionality described herein. Additionally, other components not shown may also be included within the distributed environment. In addition, or instead, integrated model analytics system 106 can be integrated, at least partially, into a user device, such as user device 102a.

Figure 1B:
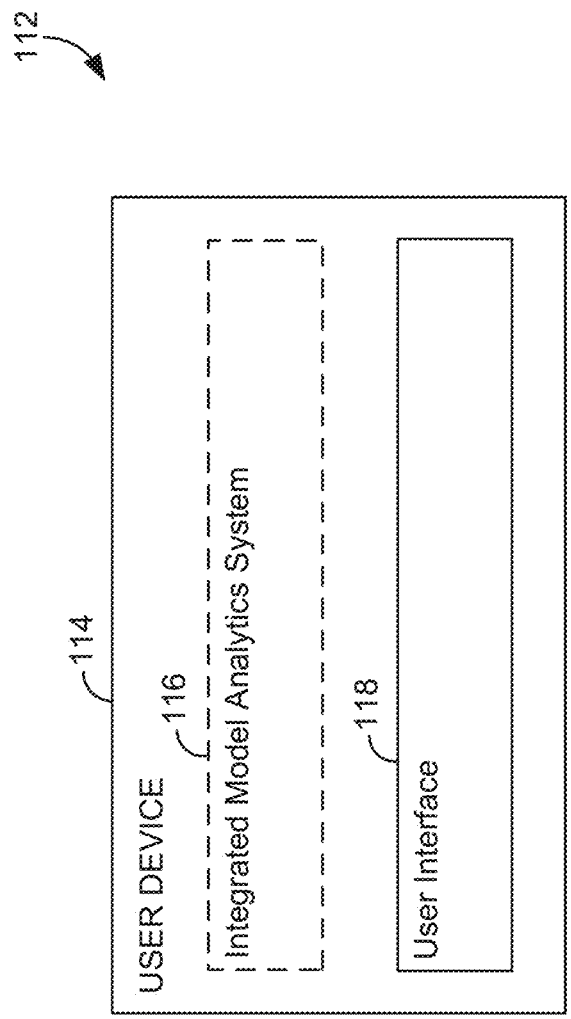
FIG. 1B depicts an example configuration of another operating environment in which some implementations of the present disclosure can be employed, in accordance with various embodiments.

Referring to FIG. 1B, aspects of an illustrative integrated model analytics system are shown, in accordance with various embodiments of the present disclosure. FIG. 1B depicts a user device 114, in accordance with an example embodiment, configured to allow for dynamically generating, integrating, and/or deploying multiple models capable of providing recommendation using an integrated model analytics system 116. The user device 114 may be the same or similar to the user device 102a-102n and may be configured to support the integrated model analytics system 116 (as a standalone or networked device). For example, the user device 114 may store and execute software/instructions to facilitate interactions between a user and the integrated model analytics system 116 via the user interface 118 of the user device.

A user device can be utilized by a user to visit a website, application, etc. associated with a business. In particular, as the user interacts with the website, application, etc. associated with the business, the user can be classified. For instance, a classifier can be used to identify subsets of user segments based on applications the user has subscribed to and/or interactions by the user with applications associated with the business. Based on the user segment that the user is classified into, the user can be associated with a feature bucket. In turn, this feature bucket can correspond to a particular set of models (e.g., photography bucket, document bucket, etc.). This particular set of models can then be used to provide recommendations for the user related to the website (e.g., order of content on a webpage, order of content returned based on a user search query, etc.).

Figure 2:
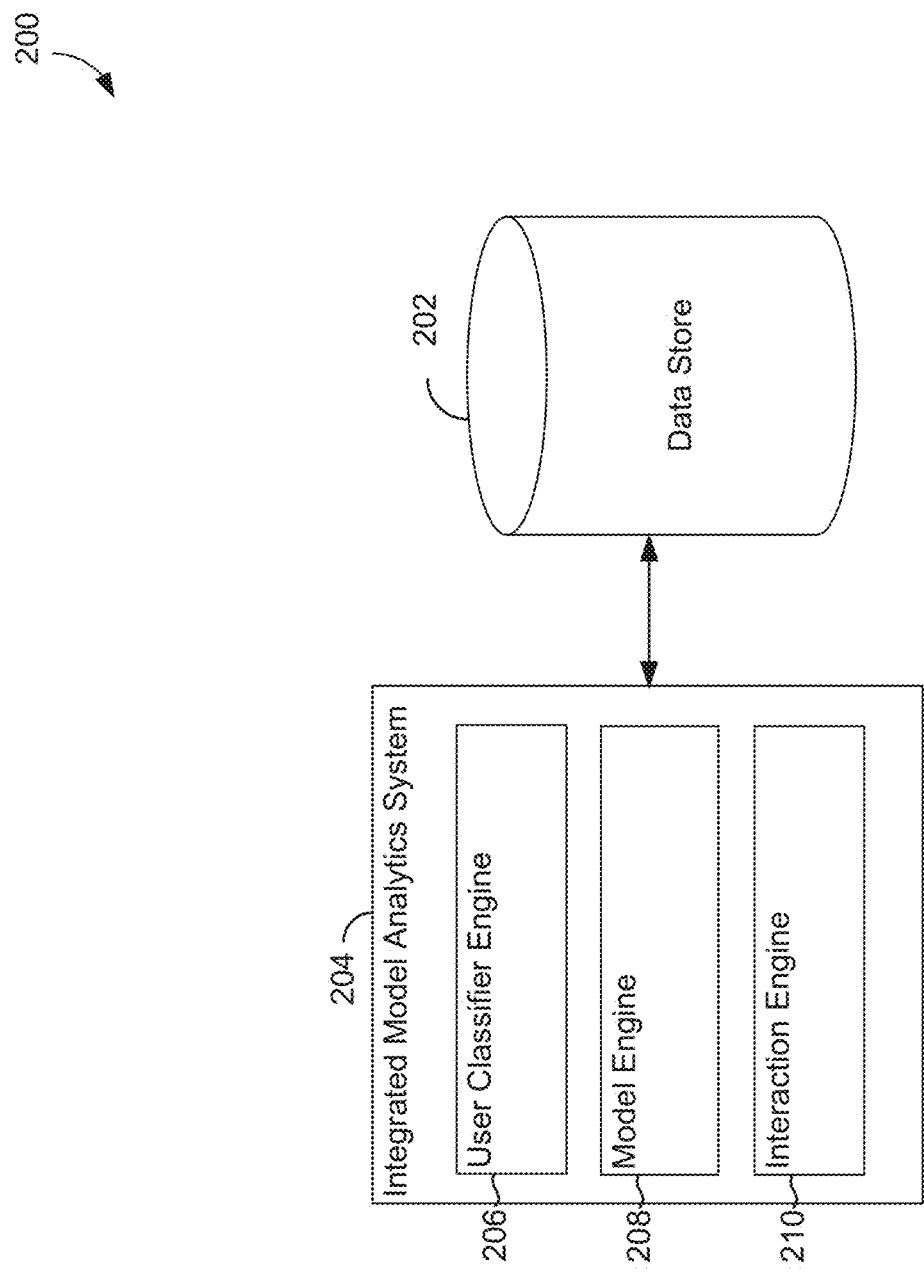
FIG. 2 depicts an example configuration of an operating environment in which some implementations of the present disclosure can be employed, in accordance with various embodiments.

FIG. 2 depicts an example configuration of an operating environment in which some implementations of the present disclosure can be employed, in accordance with various embodiments. It should be understood that this and other arrangements described herein are set forth only as examples. Other arrangements and elements (e.g., machines, interfaces, functions, orders, and groupings of functions, etc.) can be used in addition to or instead of those shown, and some elements may be omitted altogether for the sake of clarity. Further, many of the elements described herein are functional entities that may be implemented as discrete or distributed components or in conjunction with other components, and in any suitable combination and location. Various functions described herein as being performed by one or more entities may be carried out by hardware, firmware, and/or software. For instance, some functions may be carried out by a processor executing instructions stored in memory as further described with reference to FIG. 8. It should be understood that operating environment 200 shown in FIG. 2 is an example of one suitable operating environment. Among other components not shown, operating environment 200 includes a number of user devices, networks, and server(s).

As depicted, integrated model analytics system 204 includes user classifier engine 206, model engine, 208, and interaction engine 210. The foregoing engines of integrated model analytics system 204 can be implemented, for example, in operating environment 100 of FIG. 1A and/or operating environment 112 of FIG. 1B. In particular, those engines may be integrated into any suitable combination of user devices 102a and 102b through 102n and server(s) 106 and/or user device 114. While the various engines are depicted as separate engines, it should be appreciated that a single engine can perform the functionality of all engines. Additionally, in implementations, the functionality of the engines can be performed using additional engines and/or components. Further, it should be appreciated that the functionality of the engines can be provided by a system separate from the integrated model analytics system.

As shown, integrated model analytics system 204 operates in conjunction with data store 202. Data store 202 stores computer instructions (e.g., software program instructions, routines, or services), data, and/or models used in embodiments described herein. In some implementations, data store 202 stores information or data received via the various engines and/or components of integrated model analytics system 204 and provide the engines and/or components with access to that information or data, as needed. Although depicted as a single component, data store 202 may be embodied as one or more data stores. Further, the information in data store 202 may be distributed in any suitable manner across one or more data stores for storage (which may be hosted externally).

In embodiments, data stored in data store 202 includes user data. User data can comprise raw data. A pre-processing pipeline can be utilized to process the raw data. Specifically, the raw data can be processed for use in training and/or updating one or more models. Raw data can be obtained from data store 202 (e.g., raw data stored in data store 202). Variables can be identified in the raw data such that the variables can be input into a model. For instance, variables can be used to train the model. For instance, variables can be identified that can be used to train a model.

Training data generally refers to data (e.g., from the raw data) used in machine learning, or portion thereof. As such, training data can include user behavior, variables (e.g., from processed raw data) etc. In some cases, data can be received from and sent to integrated model analytics system 204. In other cases, data can be received directly from user devices or from one or more data stores in the cloud.

In embodiments, data stored in data store 202 can also include one or more models. Models can be generated using any number of model generating techniques (e.g., AWS SageMaker). A model can comprise any type of machine learning model (e.g., supervised, unsupervised, deep learning, etc.). Such models can have designated attributes that are associated with a model. As an example, such designated attributes can include a name (e.g., feature name), description (e.g., of the attribute, feature flags, and/or how a model is associated with the feature is trained), content associated with the model, and/or other information (e.g., tags).

Integrated model analytics system 204 can be used to intelligently integrate multiple models for enhanced user analytics to improve user engagement with a service (e.g., with a website, application, etc.). Such a system can integrate multiple models for performing data analytics such that real-time interactions from a particular user segment and/or user can be used to dynamically update any of the multiple models that are related to the interactions (e.g., based on the interactions relating to attributes associated with one or more models). In particular, the integrated model analytics system 204 can classify users into user segments based on one or more features (e.g., entitlement level for a product, subscription to one or more products, etc.). Based on this classification, one or more machine learning models can be associated with a user or user segment. These one or more machine learning models can be used to provide information related to the user or user segment (e.g., a recommendation). This information can be used, for example, when generating content for a user in a user segment (e.g., generating interactive content on a webpage). In addition, the integrated model analytics system 204 can be used to receive real-time interactions with content from a user or particular user segment. Based on these real-time interactions, one or more machine learning models related to the interactions can be updated (e.g., based on the interactions relating to attributes overcoming a predefined threshold related to a model(s)). In this way, the integrated model analytics system 204 can be used to dynamically update and (re)deploy multiple machine learning models based on user interactions and feedback from among the multiple machine learning models. For instance, the updated model can be used to provide new and/or updated recommendations for use in generating content for the user in a user segment (e.g., generating interactive content on a webpage).

User classifier engine 206 can be used to classify users into user segments based on one or more feature (e.g., entitlement level for product(s), subscription to one or more products, etc.). For instance, a user segment can be based on a grouping of users based on similar interests and/or similar characteristics. Such user segments (e.g., based on features) can be used, for instance, to group similar users into a bucket (e.g. feature bucket). This feature bucket can then be assigned one or more machine learning models related to the features of the users in the associated user segment. For example, if the users in the user segment have purchased a first set of editing applications, one or more associated machine learning models related to the first set of editing applications can be assigned to that feature bucket. As another example, if the users in the user segment have purchased photo-editing applications, one or more associated machine learning models related to photo editing can be assigned to that feature bucket.

In some embodiments, a classification model can be used to classify users. To generate a classification model, user behavior data and/or features associated with a user can be correlated with information about a particular user segment. Such user behavior data can include, for example, interactions with content by a user. Features can relate to, for instance, entitlement level for product(s), subscription to one or more products, product subscriptions, product use, product interactions, product variety, etc. Training data can be generated by combining these features user behavior data in relation with preset user segments. The classification model can then be trained using the training data. For example, a classification model can be trained to classify users based on entitlement of the users (e.g., products and/or applications the user is subscribed to use). In embodiments, the classification model can initially use a rule-based process to classify users. For instance, a rule-based process based on entitlement of a user can be used to place a user in a specific user segment that can then correspond to a particular feature bucket (e.g., associated with one or more models). Over time, the classification model can be updated to incorporate learned information about users (e.g., based on user interactions with content, how a user uses a product, etc.) to create more granular user segments.

Upon classifying a user, user classifier engine 206 can place the user into a corresponding feature bucket. Placing the user into a feature bucket can comprise storing a user identification in association with a particular set of models (e.g., photography bucket, document bucket, etc.) that correspond to the feature bucket. In this way, based on the feature bucket a user is placed within, a particular set of models can be identified and deployed to make recommendations for the user. In addition, as the user interacts with, for example, one or more products, the particular set of models can be dynamically updated, as discussed further herein. In some embodiments, a user can be placed within more than one feature bucket.

In some embodiments, the user classifier engine 206 can enable feature flags related to a user. A feature flag, as used herein, can generally be used to indicate whether a feature is associated with a user. For instance, based on an analysis of user data, a determination can be made whether a feature flag should be enabled for the user. As an example, entitlement information related to the user can be analyzed and one or more feature flags enabled based on the entitlement of the user. In particular, if a user has entitlement to various applications related to photography, a photography feature flag can be enabled for the user. Upon enabling a feature flag for a user, the enabled feature flag can be associated with the user. For instance, a feature flag can be added to a user profile associated with the user.

Further, the user classifier engine 206 can use the feature flags associated with a user to determine a user segment for the user. For instance, the user classifier engine 206 can generate user segments (e.g., based on user behavior, user interest, product subscriptions, etc.). User segments can be generated using any number of segmentation techniques.

Based on the feature flags associated with a user, the user classifier engine 206 can place the user into an appropriate user segment.

Model engine 208 can be used to obtain one or more machine learning models. For instance, in some embodiments, the model engine 208 can generate machine learning models. In other embodiments, the model engine 208 can receive a previously trained and/or updated machine learning model. To generate a machine learning model, data (e.g., features, etc.) can be correlated with information related to user behavior (e.g., to make a recommendation). Raw data can be standardized to generate meaningful data attributes (e.g., product use frequency, product use recency, product variety, etc.) for use in generating the models. For instance, training data can be generated by combining these data attributes (e.g., user behavior and/or user variables) with known user behavior (e.g., interactions with content). Models can then be trained using the training data.

Upon generating the machine learning models, the models can be stored in a repository (e.g., data store 202). A particular set of machine learning models can be accessed from the repository based on what feature bucket a user is classified to fall within (e.g., based on the user segment of the user). For instance, a user classified into a photography feature bucket can be associated with a particular set of machine learning models related to products and/or applications related to photography. When a user interacts with a system, the system can request that the repository deploy the set of models. For instance, by deploying the particular set of machine learning models, the models can be used to generate a set of recommendations for the user. These recommendations can be used in relation to a service, such as, for example, products and/or applications (e.g., order of content on a webpage, order of content returned based on a user search query, etc.). For instance, when deployed, a machine learning model that is trained to recommend new products to the user can be used to recommend where to place content on a webpage (e.g., placement of recommended new products based on a recommended order).

One or more of the machine learning models can be updated periodically. For instance, the trained set of machine learning models can automatically be updated based on user interactions. When one or more of the machine learning models should be updated can be determined in some embodiments, using interaction engine 210. In particular, real-time interactions from a user can trigger dynamic updates of any of the set of models related to the interactions by the user. For instance, interactions by the user can relate to attributes associated with one or more machine learning models (e.g., even if the interactions are associated with content based on a recommendation from a different machine learning model). In embodiments, such attributes can be, for example, individual independent variables that act as an input in a model.

Interaction engine 210 can be used to integrate and deploy multiple machine learning models for use. For instance, a particular set of machine learning models can be identified based on a feature bucket identified for a user (e.g., using user classifier engine 206). Upon identifying the particular set of machine learning models, the interaction engine 210 can call a repository of models (e.g., data store 202) to deploy the particular set of machine learning models. The deployed particular set of machine learning models can be combined and integrated to generate recommendations for the user. For instance, the interaction engine 210 can incorporate recommendations from the multiple machine learning models into content displayed via a GUI (e.g., order of content on a webpage).

As a user interacts with content, interactions related to one or more machine learning models can trigger automatic updates of one or more of the models. For instance, such real-time interactions from the user can trigger dynamic updates of any of the set of machine learning models related to the interactions by the user. In particular, interactions by the user with content can be used to update a machine learning model even if the interactions are associated with content based on a recommendation from a different machine learning model.

Interaction engine 210 can be used to determine when a machine learning model should be updated. For example, the trained set of machine learning models can automatically be updated based on user interactions. In particular, real-time interactions from a user can trigger dynamic updates of any of the set of machine learning models related to the interactions by the user. For instance, interaction engine 210 can monitor real-time interactions from a user. When a predefined threshold is overcome (e.g., runtime attributes based on user interactions with content), interaction engine can trigger a dynamic update of any of the set of models related to the interactions by the user (e.g., by communicating with model engine 208). For instance, dynamically updating a model can generally describe retraining a model by incorporating data related to the interactions by the user.

For instance, interactions by the user can relate to attributes (e.g., runtime attributes) associated with one or more machine learning models (e.g., even if the interactions are associated with content based on a recommendation from a different machine learning model). As an example, if a first machine learning model recommends content based on categories, and a second machine learning model recommends applications to buy, when a user interacts with content based on the recommended categories, the user interactions can also be used to update the second model (e.g., when the interactions also relate to attributes associated with the second model). In this way, the interactions can dynamically trigger an update of both machine learning models.

In embodiments, interactions with content can trigger an update for a machine learning model(s) when a predefined threshold is overcome. For instance, interactions with images related to a particular product (e.g. stock photos) can overcome a predefined threshold of runtime attributes when there have been a number of interactions over time or a number of interaction within a set amount of time.

In some embodiments, machine learning models can be updated after a designated time threshold is reached. For instance, interaction engine 210 can also monitor an amount of time from when a model was updated. In particular, interaction engine 210 can be used to ensure that models are updated after a designated time threshold is reached (e.g., from a previous update of the model). For instance, after a designated timeframe has passed (e.g., time threshold is reached), one or more models can be updated to incorporate real-time interactions of a user with content.

In embodiments, an initial state can be used to initiate automatic updating and redeployment of machine learning models. In this initial state, a rule-based approach can be used to update the machine learning models. For instance, a set of rules can be used to guide interactive updates among the machine learning models. As an example, if a sale of fonts for a segment of users (e.g., users with an individual subscription to an application) is above a predefined amount, then more weight can be applied to font-related applications when making recommendations for other applications to buy (e.g. so font-related applications are highly ranked in the recommendation(s)). In some embodiments, over time, the rule-based approach can be replaced using a machine learning approach. For instance, as a machine learning model is updated based on interactions by one user segment, that model can also be updated for any other user segment associated with that machine learning model.

Figure 3:
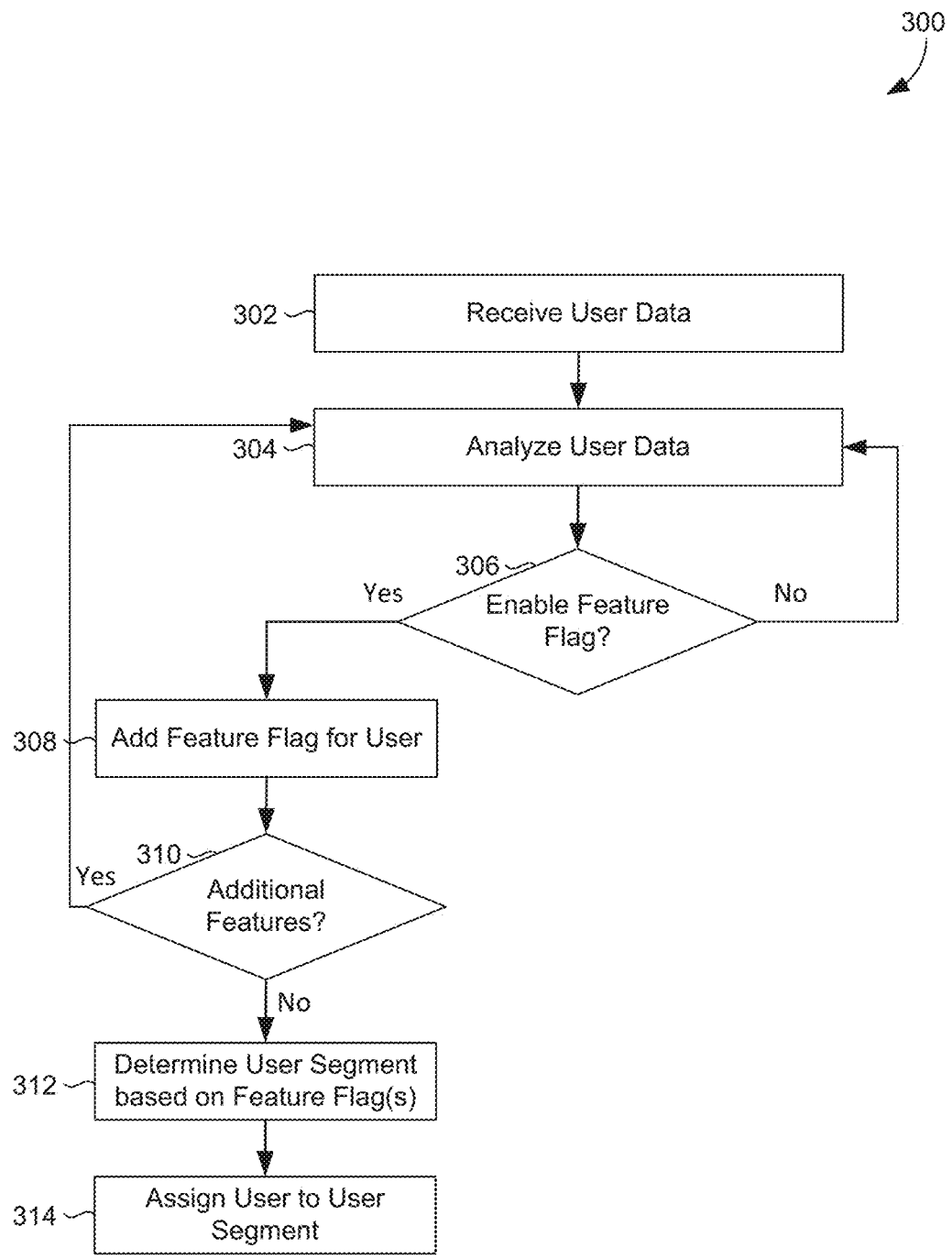
FIG. 3 provides a process flow showing an embodiment for classifying a user into a user segment for identifying a particular set of models to deploy in relation to the user, in accordance with embodiments of the present disclosure.

Turning now to FIG. 3, a process flow shows an embodiment of method 300 for classifying a user into a user segment for identifying a particular set of models to deploy in relation to the user, in accordance with embodiments of the present disclosure. Method 300 can be performed, for example by integrated model analytics 204, as illustrated in FIG. 2.

At block 302, user data is received. The user data can be received upon a user visiting a website, application, etc. associated with a business. In other embodiments, user data can be received upon a user signing up for a subscription associated with the business. Such user data can comprise information related to a user. For instance, such information can include entitlement information for the user. As an example, entitlement information can include what applications a user has subscribed to (e.g., all applications associated with the business, photography applications, individual applications, etc.). User information can also include information about what market segment a user belongs to (e.g., business, student, teacher, schools, university, etc.).

At block 304, user data is analyzed. User data can be analyzed using, for example, a classifier (e.g., user classification engine 206). In embodiments, entitlement information from the user data can be analyzed. At block 306, a determination is made as to whether a feature flag should be enabled for a user. As an example, entitlement information related to the user can be analyzed based on subscription(s) the user. In particular, if a user has a subscription to various applications related to photography, a photography feature flag can be enabled for the user. When there is a determination to enable a feature flag at block 306, the feature flag is associated with the user at block 308. For instance, associating a feature flag with a user can comprise adding the feature flag to a user profile associated with the user.

At block 310, a determination is made as to whether there are additional features to analyze. When there are additional features to analyze, the process of method 300 can return to block 304 where user data is further analyzed in relation to an additional feature. When a determination is made at block 310 that there are not additional features to analyze, the process of method 300 can continue to block 312.

At block 312, a user segment is determined for a user. In particular, the user segment can be determined based on feature flag(s) associated with the user. For instance, a classifier (e.g., user classification engine 206) can be used to analyze the feature flag(s) to determine a user segment for the user. Such a user segment can be based on a grouping of users based on similar interests and/or similar characteristics (e.g., exemplified using the feature flag(s). For instance, a user segment can be a grouping of users with an interest in photography (e.g., where users have a feature flag related to photography). As another example, a user segment can be a grouping of users with an interest in document processing. Further, such a user segment with an interest in document processing can be narrowed down, for example, to students or teachers.

Upon determining a user segment for the user, the user is assigned to at least one user segment at block 314. For instance, the user can be assigned to the user segment determined at block 312. This user segment can be associated with a corresponding feature bucket. In addition, this feature bucket can correspond to a particular set of models (e.g., photography bucket, document bucket, etc.). In this way, when a user is classified within a particular user segment, a set of models can also be associated with that user. This set of models can be a targeted set of models specifically selected (e.g., intelligently selected) based on characteristics of the user segment (e.g., entitlement information related to the user segment).

Figure 4:
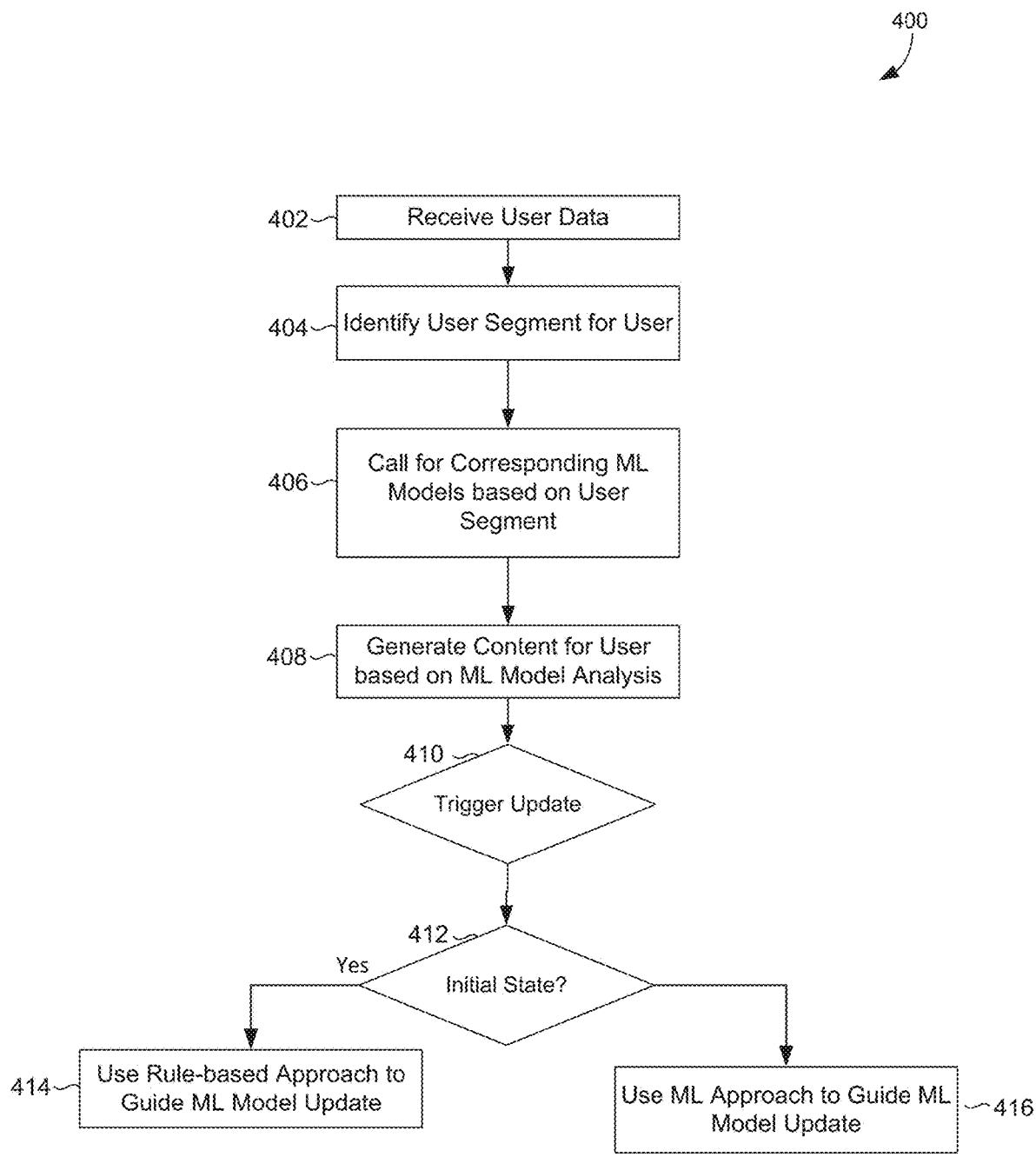
FIG. 4 provides a process flow showing an embodiment for intelligently integrating multiple machine learning models for enhanced user analytics to improve user engagement, in accordance with embodiments of the present disclosure.

FIG. 4 provides a process flow showing an embodiment of method 400 for intelligently integrating multiple machine learning models for enhanced user analytics to improve user engagement, in accordance with embodiments of the present disclosure. Method 400 can be performed, for example by the integrated model analytics system 204, as illustrated in FIG. 2.

At block 402, user data is received. The user data can be received upon a user visiting a website, application, etc. associated with a business. In other embodiments, user data can be received upon a user signing up for a subscription associated with the business. Such user data can comprise information related to a user. For instance, such information can include entitlement information for the user. As an example, entitlement information can include what applications a user has subscribed to (e.g., all applications associated with the business, photography applications, individual applications, etc.). User information can also include information about what market segment a user belongs to (e.g., business, student, teacher, schools, university, etc.).

At block 404, a user segment is identified for the user. In particular, user data (e.g., received at block 402) can be analyzed to identify a user segment. Such a user segment can be based on a grouping of users based on similar interests and/or similar characteristics. For instance, a user segment can be a grouping of users with an interest in photography (e.g., where users have a feature flag related to photography). As another example, a user segment can be a grouping of users with an interest in document processing. Further, such a user segment with an interest in document processing can be narrowed down, for example, to students or teachers. In particular, user data can be analyzed using, for example, a classifier (e.g., user classification engine 206). For instance, a classifier can be used to analyze characteristics of the user to classify the user into a user segment. In some embodiments, the classifier can analyze entitlement information from the user data (e.g., based on the entitlement of the user to applications and/or products) to classify the user into a user segment.

At block 406, corresponding machine learning models are called for deployment. Such corresponding machine learning models can be based on the user segment. In particular, the corresponding machine learning models can be associated with a feature bucket for the user segment. For instance, a feature bucket associated with a user segment can correspond to a particular set of models (e.g., photography bucket, document bucket, etc.). In this way, when a user is classified within a feature bucket, a set of models can be called to make recommendations for the user. Such corresponding machine learning models can be called from a repository upon being identified.

At block 408, content is generated for the user based on the machine learning models. In particular, content can be generated based on recommendations made by analysis of data by the machine learning models. For instance, the machine learning models can provide recommendations for the user related to the web site (e.g., order of content on a webpage, order of content returned based on a user search query, etc.). These recommendations can be used in relation to products and/or applications (e.g., order of content on a webpage, order of content returned based on a user search query, etc.). For instance, when deployed, recommendations generated by a model trained to recommend new products to the user can be used to place content on a webpage related to recommended new products in a particular order.

At block 410, a determination can be made whether an update has been triggered for the machine learning models. In some embodiments, real-time interactions from the particular user segment can trigger dynamic updates of any of the multiple models related to the interactions by the particular user segment. For instance, interactions by a user with can be used to update a model even if the interactions are associated with content based on a recommendation from a different model. As an example, if a first model recommends content based on categories and a second model recommends applications to buy, when a user interacts with content based on the recommended categories, the user interactions can also be used to update the second model (e.g., when the content also relates to the second model). In this way, the interactions can dynamically trigger an update of both models based on the interactions with content overcoming a predefined threshold.

Upon triggering an update at block 410, when the system is in an initial state at block 412, a rule-based approach can be used to update the machine learning models at block 414. For instance, various predefined thresholds can be manually set for when a machine learning model update should be triggered. As an example, if a sale of fonts for a segment of users (e.g., users with an individual subscription to an application) is above a predefined amount, then more weight can be applied to font-related applications when making recommendations for other applications to buy (e.g. so font-related applications are highly ranked in the recommendation(s)). When the system is not in an initial state at block 412, a machine learning approach can be used to update the machine learning models at block 416. For instance, as a machine learning model is updated based on interactions by one user segment, that model can also be updated for any other user segment associated with that machine learning model. Upon updating the machine learning models at block 414 or block 416, the updated machine learning models can be redeployed to generate updated content for the user at block 408. In some embodiments, the updated machine learning models can be redeployed to generate updated content for a user in a different user segment from the user segment of the user (e.g., identified at block 404).

Figure 5:
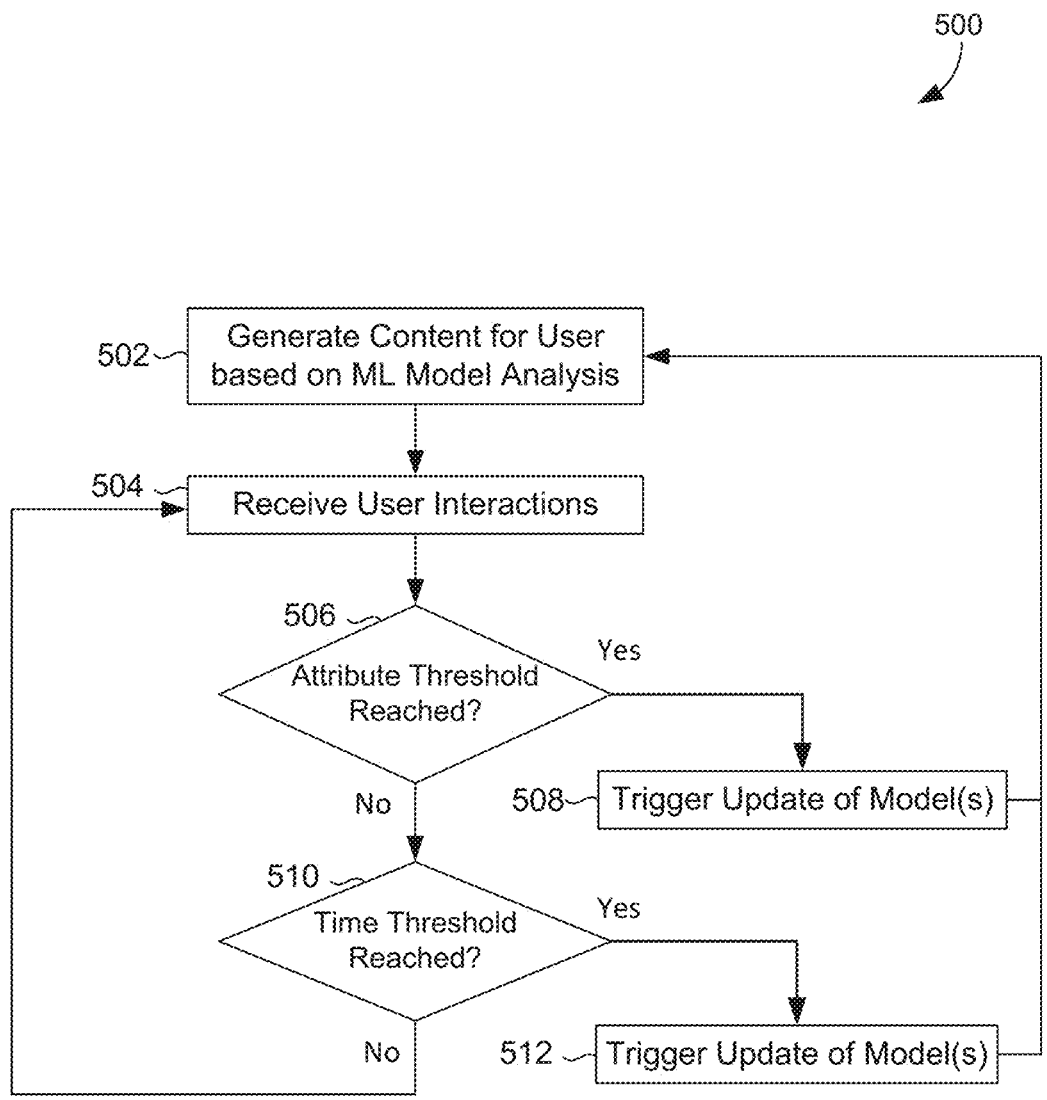
FIG. 5 provides a process flow showing an embodiment for dynamically updating multiple models, in accordance with embodiments of the present disclosure.

FIG. 5 provides a process flow showing an embodiment of method 500 for dynamically updating multiple models, in accordance with embodiments of the present disclosure. Method 500 can be performed, for example by integrated model analytics system 204, as illustrated in FIG. 2.

At block 502, content is generated for a user based on a machine learning model analysis. In particular, content can be generated based on recommendations made by the machine learning models. For instance, the machine learning models can provide recommendations for the user related to the website (e.g., order of content on a webpage, order of content returned based on a user search query, etc.). A particular set of models that is intelligently selected based on a user can be used to generate a set of recommendations. These recommendations can be used in relation to products and/or applications (e.g., order of content on a webpage, order of content returned based on a user search query, etc.). For instance, when deployed, recommendations generated by a model trained to recommend new products to the user can be used to place content on a webpage related to recommended new products in a particular order.

At block 504, user interactions are received. User interactions can be any interaction by a user with content related to a product and/or application. For instance, user interactions can comprise performing a search, interacting with content provided from the search, etc. At block 506, a determination is made whether an attribute threshold has been reached. This attribute threshold can be based on the user interactions. Such user interactions can be interactions by the user, other users in the same user segment as the user, and/or other users in a different user segment than the user. When the threshold has been reached, an update of one or more models is triggered at block 506. In embodiments, where the interactions are from other users in a different user segment than the user, the other users can be associated with one of the same models as the user. Alternatively, or in addition, at block 510, a determination is made whether a time threshold has been reached. When the threshold has been reached, an update of one or more models is triggered at block 512.

Figure 6:
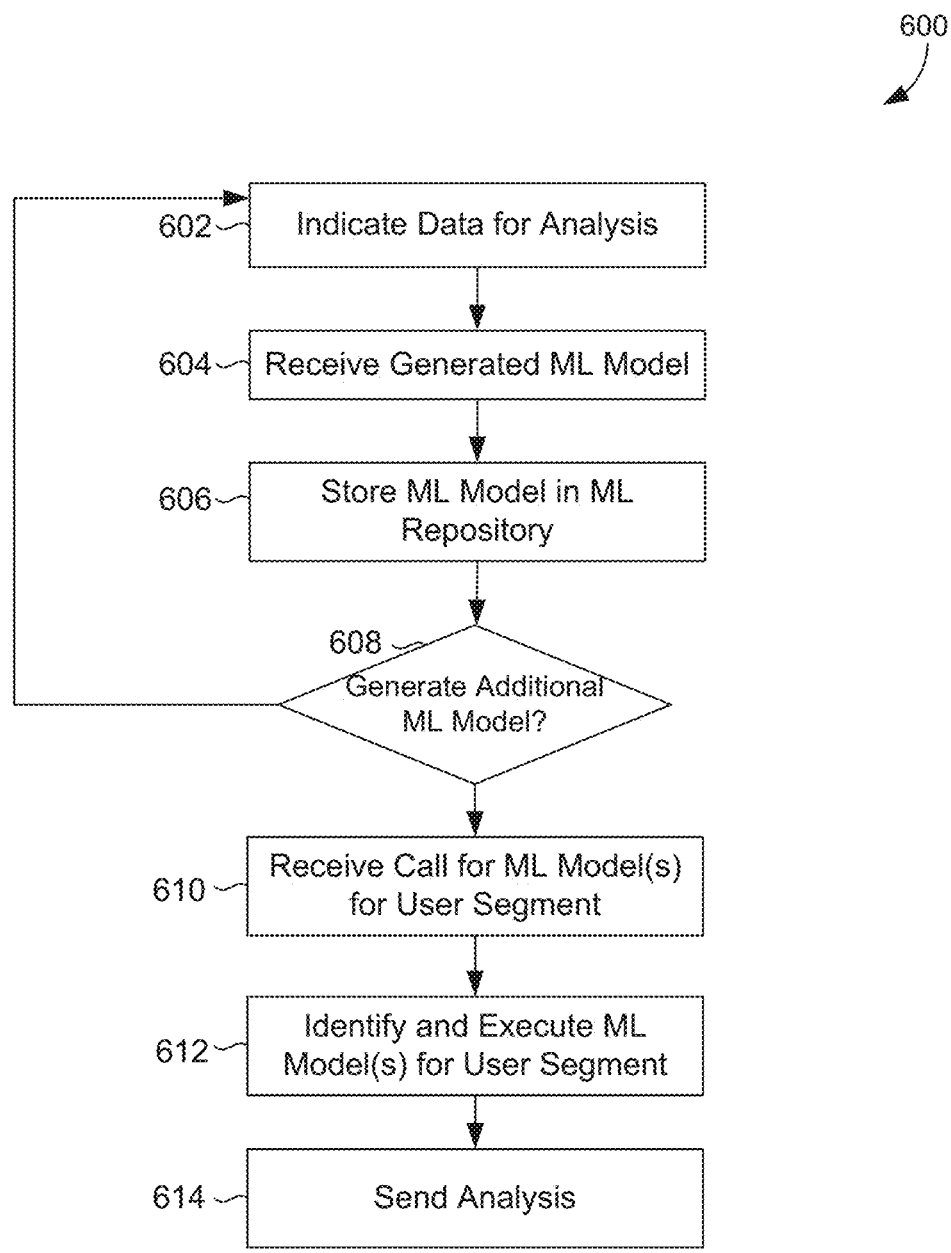
FIG. 6 provides a process flow showing an embodiment for generating and deploying multiple models for use related to a particular user segment, in accordance with embodiments of the present disclosure.

FIG. 6 provides a process flow showing an embodiment of method 600 for generating and deploying multiple models for use related to a particular user segment, in accordance with embodiments of the present disclosure. Method 600 can be performed, for example, by integrated model analytics system 204, as illustrated in FIG. 2.

At block 602, data is indicated for analysis. Such data can comprise user data. User data can comprise raw data. A pre-processing pipeline can be utilized to process the raw data. Specifically, the raw data can be processed for use in training and/or updating one or more models. Raw data can be obtained from data store 202 (e.g., raw data stored in data store 202). Variables can be identified in the raw data such that the variables can be input into a model. For instance, variables can be used to train the model. For instance, variables can be identified that can be used to train a model.

In particular, the data can be training data that can be used in machine learning, or portion thereof. As such, training data can include user behavior, variables (e.g., from processed raw data), etc. In some cases, data can be received from and sent to integrated model analytics system 204. In other cases, data can be received directly from user devices or from one or more data stores in the cloud.

At block 604, a generated machine learning model is received. Models can be generated using any number of model generating techniques. A model can comprise any type of machine learning model (e.g., supervised, unsupervised, deep learning, etc.). Such models can have designated attributes that are associated with a model. As an example, such designated attributes can include a name (e.g., feature name), description (e.g., of the attribute, feature flags, and/or how a model is associated with the feature is trained), content associated with the model, and/or other information (e.g., tags).

At block 606, the machine learning model is stored in a repository. Such a repository can include any number of machine learning models related to a business (e.g., service, product, and/or application) that can be deployed for use in recommending content for users. In embodiments, at block 608, a determination is made whether to generate additional machine learning models. For instance, additional machine learning models related to the business (e.g., service, product, and/or application) can be generated (e.g., using the process discussed at blocks 602-606).

At block 610, a call is received for a set of machine learning models related to a user segment. This set of machine learning models can be based on a particular user segment. In particular, the set of machine learning models can be associated with a feature bucket for a user segment. For instance, a feature bucket associated with a user segment can correspond to a particular set of models (e.g., photography bucket, document bucket, etc.). At block 612, machine learning models are identified and executed for the user segment. In particular, the feature bucket associated with the user segment can be used to identify the particular set of models. This set of machine learning models can be executed to generate recommendations for the user. For instance, the machine learning models can provide recommendations for the user related to the website (e.g., order of content on a webpage, order of content returned based on a user search query, etc.). These recommendations can be used in relation to products and/or applications (e.g., order of content on a webpage, order of content returned based on a user search query, etc.).

At block, 614, an analysis related to the machine learning models is sent. For instance, when deployed, recommendations generated by a model trained to recommend new products to the user can be used to place content on a webpage related to recommended new products in a particular order.

Figure 7:
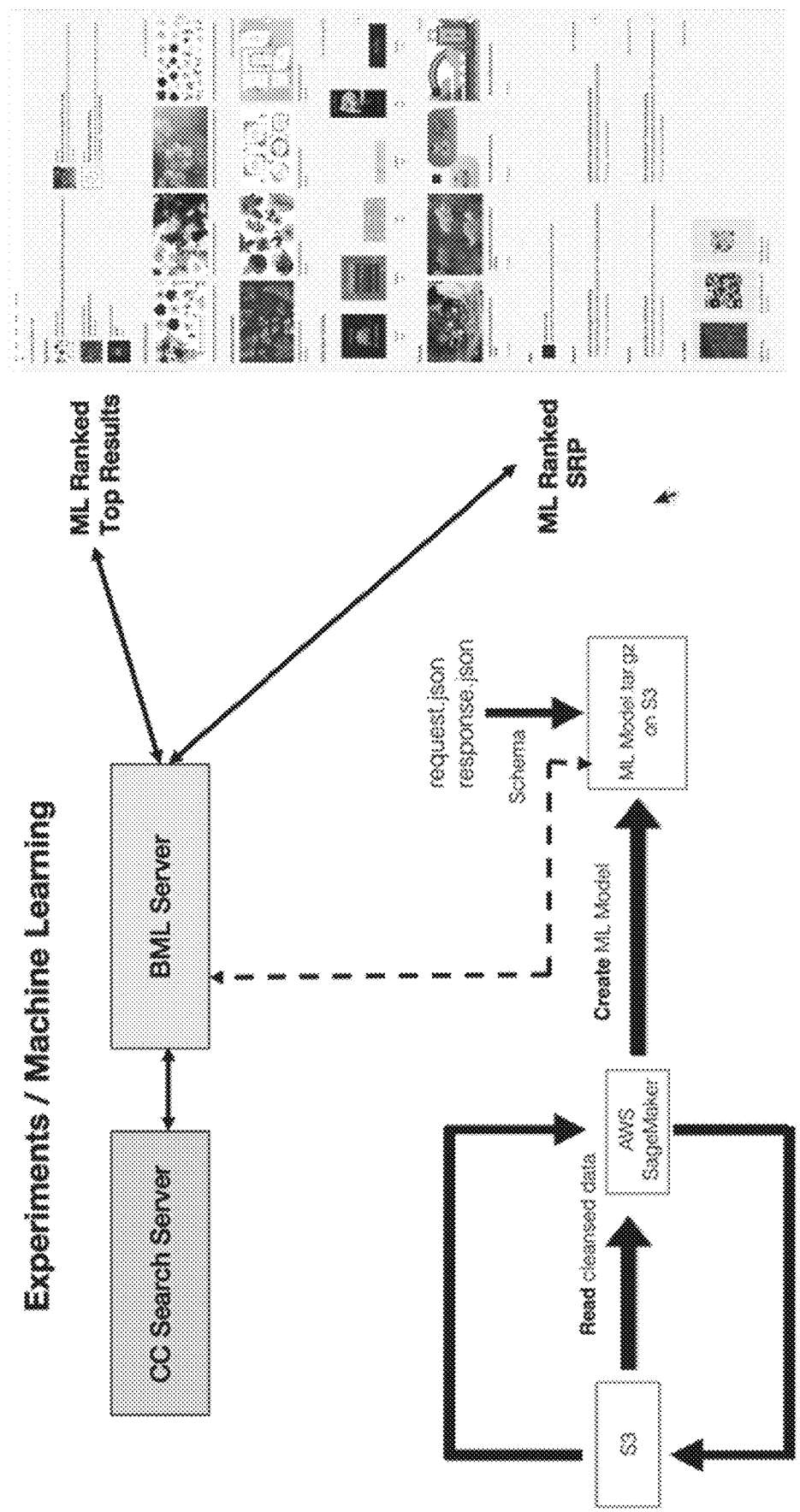
FIG. 7 depicts an illustrative use of an integrated model analytics system dynamically generating, integrating, and deploying multiple models, in accordance with embodiments of the present disclosure.

FIG. 7 depicts an illustrative use of an integrated model analytics system, in accordance with various embodiments of the present disclosure. In particular, FIG. 7 depicts an embodiment of dynamically generating, integrating, and deploying multiple models using an integrated model analytics system. As illustrated, FIG. 7 shows data selected for analysis. This data can be selected from a data store (e.g., S3). This data can undergo processing (e.g., using a pre-processing pipeline that processes the data for use in training and/or updating one or more models). This data can then be used for training one or more machine learning models. A model can comprise any type of machine learning model (e.g., supervised, unsupervised, deep learning, etc.). Models can be generated using any number of model generating techniques. For instance, as depicted, AWS SageMaker can be used to generate machine learning models.

Upon generating a machine learning model, the model can be stored in a repository. When a user interacts with a system, the system can request that the repository deploy the set of models (e.g., call a particular set of models). In particular, a client (e.g., CC Search Server) can call to a REST endpoint (e.g., behavior leaning model "BLM" server) for a set of models that can be used to generate recommendations for the user. The BLM server can obtain the set of machine learning model that can be used to provide recommendations for a GUI related to the user (e.g., that can be used to arrange/rearrange content on the GUI). For instance, recommendations can be used in relation to a service, such as, for example, products and/or applications (e.g., order of content on a webpage, order of content returned based on a user search query, etc.). In particular, as depicted, the recommendations can be used to rank content to display on the GUI.

Figure 8:
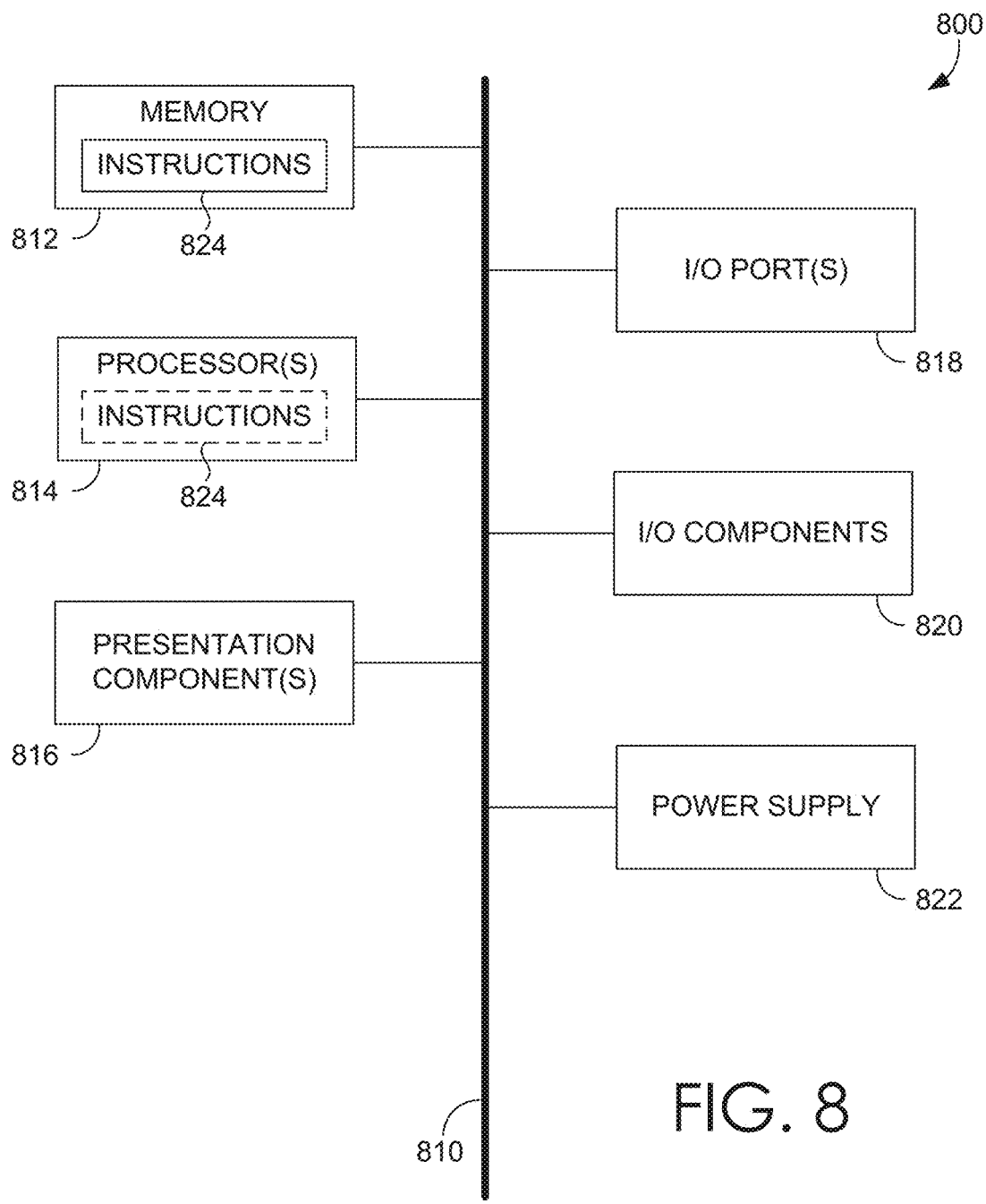
FIG. 8 is a block diagram of an example computing device in which embodiments of the present disclosure may be employed.

Having described embodiments of the present invention, an example operating environment in which embodiments of the present invention may be implemented is described below in order to provide a general context for various aspects of the present invention. Referring to FIG. 8, an illustrative operating environment for implementing embodiments of the present invention is shown and designated generally as computing device 800. Computing device 800 is but one example of a suitable computing environment and is not intended to suggest any limitation as to the scope of use or functionality of the invention. Neither should the computing device 800 be interpreted as having any dependency or requirement relating to any one or combination of components illustrated.

Embodiments of the invention may be described in the general context of computer code or machine-useable instructions, including computer-executable instructions such as program modules, being executed by a computer or other machine, such as a smartphone or other handheld device. Generally, program modules, or engines, including routines, programs, objects, components, data structures, etc., refer to code that perform particular tasks or implement particular abstract data types. Embodiments of the invention may be practiced in a variety of system configurations, including hand-held devices, consumer electronics, general-purpose computers, more specialized computing devices, etc. Embodiments of the invention may also be practiced in distributed computing environments where tasks are performed by remote-processing devices that are linked through a communications network.

With reference to FIG. 8, computing device 800 includes a bus 810 that directly or indirectly couples the following devices: memory 812, one or more processors 814, one or more presentation components 816, input/output ports 818, input/output components 820, and an illustrative power supply 822. Bus 810 represents what may be one or more busses (such as an address bus, data bus, or combination thereof). Although the various blocks of FIG. 8 are shown with clearly delineated lines for the sake of clarity, in reality, such delineations are not so clear and these lines may overlap. For example, one may consider a presentation component such as a display device to be an I/O component, as well. Also, processors generally have memory in the form of cache. We recognize that such is the nature of the art, and reiterate that the diagram of FIG. 8 is merely illustrative of an example computing device that can be used in connection with one or more embodiments of the present disclosure. Distinction is not made between such categories as "workstation," "server," "laptop," "hand-held device," etc., as all are contemplated within the scope of FIG. 8 and reference to "computing device."

Computing device 800 typically includes a variety of non-transitory computer-readable media. Non-transitory Computer-readable media can be any available media that can be accessed by computing device 800 and includes both volatile and nonvolatile media, removable and non-removable media. By way of example, and not limitation, non-transitory computer-readable media may comprise non-transitory computer storage media and communication media.

Non-transitory computer storage media include volatile and nonvolatile, removable and non-removable media implemented in any method or technology for storage of information such as computer-readable instructions, data structures, program modules or other data. Non-transitory computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computing device 800. Non-transitory computer storage media excludes signals per se.

Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

Memory 812 includes computer storage media in the form of volatile and/or nonvolatile memory. As depicted, memory 812 includes instructions 824. Instructions 824, when executed by processor(s) 814 are configured to cause the computing device to perform any of the operations described herein, in reference to the above discussed figures, or to implement any program modules described herein. The memory may be removable, non-removable, or a combination thereof. Illustrative hardware devices include solid-state memory, hard drives, optical-disc drives, etc. Computing device 800 includes one or more processors that read data from various entities such as memory 812 or I/O components 820. Presentation component(s) 816 present data indications to a user or other device. Illustrative presentation components include a display device, speaker, printing component, vibrating component, etc.

I/O ports 818 allow computing device 800 to be logically coupled to other devices including I/O components 820, some of which may be built in. Illustrative components include a microphone, joystick, game pad, satellite dish, scanner, printer, wireless device, etc.

Embodiments presented herein have been described in relation to particular embodiments which are intended in all respects to be illustrative rather than restrictive. Alternative embodiments will become apparent to those of ordinary skill in the art to which the present disclosure pertains without departing from its scope.

From the foregoing, it will be seen that this disclosure in one well adapted to attain all the ends and objects hereinabove set forth together with other advantages which are obvious and which are inherent to the structure.

It will be understood that certain features and sub-combinations are of utility and may be employed without reference to other features or sub-combinations. This is contemplated by and is within the scope of the claims.

In the preceding detailed description, reference is made to the accompanying drawings which form a part hereof wherein like numerals designate like parts throughout, and in which is shown, by way of illustration, embodiments that may be practiced. It is to be understood that other embodiments may be utilized and structural or logical changes may be made without departing from the scope of the present disclosure. Therefore, the preceding detailed description is not to be taken in a limiting sense, and the scope of embodiments is defined by the appended claims and their equivalents.

Various aspects of the illustrative embodiments have been described using terms commonly employed by those skilled in the art to convey the substance of their work to others skilled in the art. However, it will be apparent to those skilled in the art that alternate embodiments may be practiced with only some of the described aspects. For purposes of explanation, specific numbers, materials, and configurations are set forth in order to provide a thorough understanding of the illustrative embodiments. However, it will be apparent to one skilled in the art that alternate embodiments may be practiced without the specific details. In other instances, well-known features have been omitted or simplified in order not to obscure the illustrative embodiments.

Various operations have been described as multiple discrete operations, in turn, in a manner that is most helpful in understanding the illustrative embodiments; however, the order of description should not be construed as to imply that these operations are necessarily order dependent. In particular, these operations need not be performed in the order of presentation. Further, descriptions of operations as separate operations should not be construed as requiring that the operations be necessarily performed independently and/or by separate entities. Descriptions of entities and/or modules as separate modules should likewise not be construed as requiring that the modules be separate and/or perform separate operations. In various embodiments, illustrated and/or described operations, entities, data, and/or modules may be merged, broken into further sub-parts, and/or omitted.

The phrase "in one embodiment" or "in an embodiment" is used repeatedly. The phrase generally does not refer to the same embodiment; however, it may. The terms "comprising," "having," and "including" are synonymous, unless the context dictates otherwise. The phrase "A/B" means "A or B." The phrase "A and/or B" means "(A), (B), or (A and B)." The phrase "at least one of A, B and C" means "(A), (B), (C), (A and B), (A and C), (B and C) or (A, B and C)."

What is claimed is:

1. A computer-implemented method, comprising:
    identifying a user segment for a user;
    based on the user segment, deploying a set of models related to the user segment to generate recommendations for the user;
    applying the recommendations with regard to an order of interactive content for display;
    receiving interactions between the user and first interactive content, wherein the first interactive content is related to a recommendation based on a first model of the set of models;
    based on a threshold of runtime attributes related to the interactions being reached, updating a second model, of the set of models, associated with the runtime attributes, wherein the second model is different from the first model and is updated based on the interactions between the user and the first interactive content related to the recommendation based on the first model; and
    generating at least one updated recommendation for the user based on deploying the updated second model of the set of models.

2. The computer-implemented method of claim 1, wherein the user segment is identified using a classifier based on user interests and characteristics.

3. The computer-implemented method of claim 1, further comprising:
    analyzing user data;
    enabling one or more feature flags based on the user data; and
    assigning the user to the user segment based on the enabled one or more feature flags.

4. The computer-implemented method of claim 3, wherein the feature flags are associated with entitlement information related to subscribed applications.

5. The computer-implemented method of claim 3, wherein assigning the user to the user segment based on the enabled one or more feature flags comprises placing the user into a feature bucket, wherein the feature bucket is associated with the set of models.

6. The computer-implemented method of claim 1, further comprising:
generating at least one corresponding recommendation for users in a different user segment based on deploying the updated second model of the set of models, wherein the users in the different user segment are associated with the second model.

7. The computer-implemented method of claim 1, further comprising:
based on a threshold of time being reached before the threshold of runtime attributes related to the interactions is reached, updating the one or more of the set of models.

8. The computer-implemented method of claim 1, further comprising:
providing a graphical user interface ("GUI") with the interactive content based on the recommendations; and
providing an updated GUI with updated interactive content based on the updated recommendations for the user.

9. The computer-implemented method of claim 1, wherein parameters of the second model are updated using data related to the interactions, the parameters based on user interest related to the interactive content as indicated by the interactions between the user and the first interactive content.

10. One or more computer storage media storing computer-useable instructions that, when used by one or more computing devices, cause the one or more computing devices to perform operations comprising:
based on a user segment, deploying a particular set of models related to the user segment to generate recommendations for a first user;
applying the recommendations with regard to interactive content;
receiving interactions between the first user and the interactive content;
based on the interactions reaching a predefined threshold, updating one or more of the particular set of models associated with the interactions with the interactive content; and
generating one or more corresponding recommendations for a second user in a different user segment based on deploying the updated one or more of the particular set of models, wherein the second user in the different user segment is associated with the updated one or more of the set of models.

11. The one or more computer storage media of claim 10, wherein the operations further comprise:
identifying the user segment using a classifier based on user interests and characteristics.

12. The one or more computer storage media of claim 10, wherein the operations further comprise:
analyzing user data;
enabling one or more feature flags based on the user data; and
assigning the first user to the user segment based on the enabled one or more feature flags.

13. The one or more computer storage media of claim 12, wherein the feature flags are associated with entitlement information related to subscribed applications.

14. The one or more computer storage media of claim 12, wherein assigning the first user to the user segment based on the enabled one or more feature flags comprises placing the first user into a feature bucket, wherein the feature bucket is associated with the set of models.

15. The one or more computer storage media of claim 10, the operations further comprising:
based on a threshold of time being reached before the threshold of runtime attributes related to the interactions is reached, updating the one or more of the set of models.

16. The one or more computer storage media of claim 10, the operations further comprising;
providing, to the first user, a first version of a graphical user interface ("GUI") with the interactive content based on the recommendations; and
providing, to the second user, a second version of a GUI with targeted interactive content based on the corresponding recommendations.

17. The one or more computer storage media of claim 10, the operations further comprising:
generating updated recommendations for the first user based on redeploying the updated one or more of the set of models.

18. A computing system comprising:
a memory component; and
a processing device coupled to the memory component, the processing device to perform operations comprising:
based on a user segment, deploying a particular set of models related to the user segment to generate recommendations for a first user;
applying the recommendations with regard to interactive content;
receiving interactions between the first user and the interactive content;
based on the interactions reaching a predefined threshold, updating one or more of the particular set of models associated with the interactions with the interactive content; and
generating one or more corresponding recommendations for a second user in a different user segment based on deploying the updated one or more of the particular set of models, wherein the second user in the different user segment is associated with the updated one or more of the set of models.

19. The computing system of claim 18, wherein the operations further comprise identifying the user segment using a classifier based on user interests and characteristics.

20. The computing system of claim 19, wherein the operations further comprise:
analyzing user data;
enabling one or more feature flags based on the user data; and
assigning the first user to the user segment based on the enabled one or more feature flags.

* * * * *